United States Patent
Schenk-Cooper et al.

(10) Patent No.: US 10,356,594 B2
(45) Date of Patent: Jul. 16, 2019

(54) METHODS AND DEVICES FOR PROXIMITY IN-APP SENSOR PAIRING

(71) Applicants: Kathrin Schenk-Cooper, Sacramento, CA (US); Steve Schilz, Sacramento, CA (US); Scott Wild, Granite Bay, CA (US)

(72) Inventors: Kathrin Schenk-Cooper, Sacramento, CA (US); Steve Schilz, Sacramento, CA (US); Scott Wild, Granite Bay, CA (US)

(73) Assignee: PASCO SCIENTIFIC, Roseville, CA (US)

(*) Notice: Subject to any disclaimer, the term of this patent is extended or adjusted under 35 U.S.C. 154(b) by 0 days.

(21) Appl. No.: 15/396,383

(22) Filed: Dec. 30, 2016

(65) Prior Publication Data

US 2018/0192279 A1 Jul. 5, 2018

(51) Int. Cl.
*H04W 4/38* (2018.01)
*H04W 4/60* (2018.01)
*H04W 4/70* (2018.01)
*H04W 4/80* (2018.01)
*H04W 8/00* (2009.01)

(52) U.S. Cl.
CPC ............. *H04W 8/005* (2013.01); *H04W 4/38* (2018.02); *H04W 4/60* (2018.02); *H04W 4/70* (2018.02); *H04W 4/80* (2018.02)

(58) Field of Classification Search
CPC ......... H04W 8/005; H04W 4/60; H04W 4/70; H04W 4/80
USPC ......................................... 45/41.2, 41.1, 517
See application file for complete search history.

(56) References Cited

U.S. PATENT DOCUMENTS

2014/0244007 A1* 8/2014 Kampman ......... A63B 24/0062
                                                              700/91
2016/0239795 A1* 8/2016 Burch, V ................ G01F 17/00

* cited by examiner

*Primary Examiner* — Nguyen T Vo
(74) *Attorney, Agent, or Firm* — Womble Bond Dickinson (US) LLP

(57) ABSTRACT

Methods and wireless devices for proximity in-app sensor pairing for science education are described. The method may include initiating a science software application on a wireless device, automatically displaying a sensor connection display on a user interface of the wireless device with the sensor connection display including selectable available sensors, obtaining wireless sensor connection information for sensors that are advertising their availability to the wireless device, and sorting the available sensors by the wireless sensor connection information including received signal strength indicator (RSSI) information.

20 Claims, 5 Drawing Sheets

METHODS AND DEVICES FOR PROXIMITY IN-APP SENSOR PAIRING

TECHNICAL FIELD

Embodiments of the present invention relate to methods and wireless devices for proximity in-app sensor pairing for science education.

BACKGROUND

Science educators present learning material such as science experiments or laboratories with science software applications to teach students science including the principals of Newton's $2^{nd}$ and $3^{rd}$ laws of motion. These experiments use different types of sensors for collecting data for these science experiments. The science software applications can be loaded on a user's device for use during the science experiments or laboratories. Conventional methods pair the user's device with sensors and then present on a user interface of the user's device the sensors as an unordered list of sensors or a list ordered by sensor identifier. This can lead to user frustration in locating a user's sensor.

SUMMARY

Described herein are methods and wireless devices for proximity in-app sensor pairing for science education. In one example, a computer implemented method comprises initiating a science software application on a wireless device, automatically displaying a sensor connection display on a user interface of the wireless device with the sensor connection display including selectable available sensors, obtaining wireless sensor connection information for sensors that are advertising their availability to the wireless device, and sorting the available sensors by the wireless sensor connection information including received signal strength indicator (RSSI) information.

BRIEF DESCRIPTION OF THE DRAWINGS

The present invention is illustrated by way of example, and not by way of limitation, in the figures of the accompanying drawings and in which.

DETAILED DESCRIPTION

Figure 1:
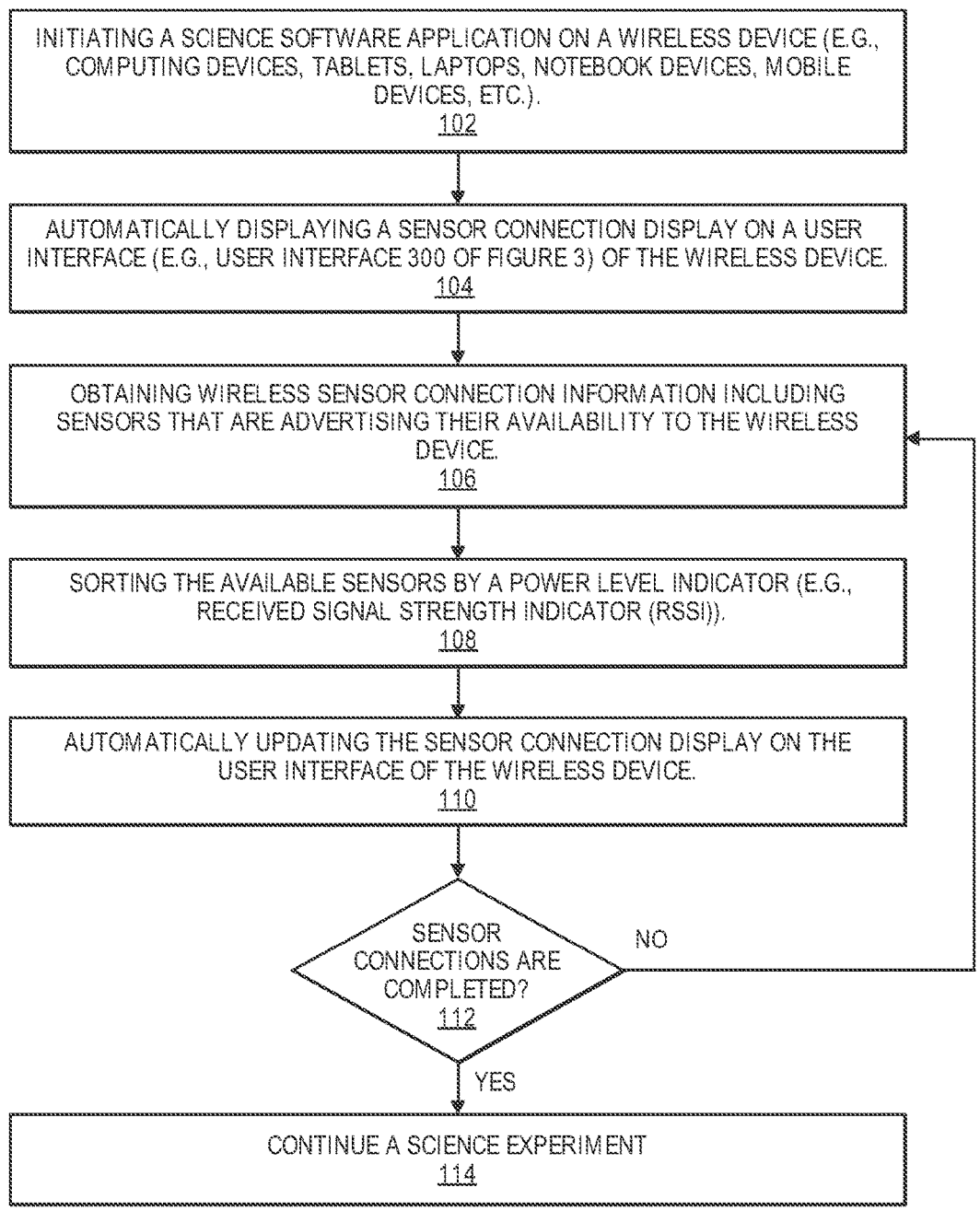
FIG. 1 illustrates a flow diagram of one embodiment for a method 100 of proximity in-app sensor pairing.

Described herein are methods and devices for proximity in-app sensor pairing for science education. These methods for pairing wireless devices that are operating data capture, analysis, and display software for the science experiment and wireless sensors improve ease of use for students connecting to wireless sensors in a classroom environment. A classroom environment may have numerous wireless sensors powered on and operational at the same time and students need to connect to specific sensors used at their station. The methods described herein improve an ability to connect with the appropriate sensor by ordering wireless sensors based on proximity to the wireless device of the student. In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Embodiments of present design enable users (e.g., students, teachers) to easily connect wireless devices of the users with desired wireless sensors (e.g., any type of wireless sensor, pressure sensor, temperature sensor, chemical sensor, force, acceleration, and rotation sensor, light sensor, current sensor, voltage sensor, conductivity sensor, smart cart, vehicle, levitating device, drone, self-guided device, self-propelled device, etc) during a science experiment.

In one example, a sensor may be an integrated wireless device (e.g., Smart Cart having weight of 200-300 grams) that incorporates four wheels on solid axles with low-friction ball bearings to minimize rolling resistance. In this example, a shaft encoder on the rear axle and a quadrature decoder in the body (or at least one processing unit) are used together to precisely measure forward and backward Cart position over time. Linear acceleration is measured directly using an integrated three-axis (x,y,z) MEMs accelerometer. Cart slope is measured using an integrated MEMs gyroscope physically aligned with the accelerometer. An integrated load cell is used to measure externally applied or impact forces. All sensor measurements are time synchronized by a central microprocessor and then transmitted over a Bluetooth wireless link to a user's wireless device for recording, analysis and display. At least one processing unit or a central microprocessor communicate through an electrical connector to control optional accessories.

In one embodiment, the Smart Cart contains a force load cell, a 6-axis accelerometer/gyroscope, optical shaft encoder with built-in decoder, microprocessor for the Bluetooth Smart radio and control, rechargeable Lithium Polymer battery with built-in charger, USB connection for battery charging and firmware upgrades, a manually or electronically activated spring loaded plunger for impulse action, and an electrical connector for accessory attachments.

FIG. 1 illustrates a flow diagram of one embodiment for a method 100 of proximity in-app sensor pairing. The method 100 is performed by processing logic that may comprise hardware (circuitry, dedicated logic, etc.), software (such as is run on a general purpose computer system or a dedicated machine or a device), or a combination of both. In one embodiment, the method 100 is performed by processing logic of at least one wireless device (e.g., computing devices, tablets, laptops, notebook devices, mobile devices, etc.) that communicates with a wireless sensing device (e.g., any type of sensor, pressure sensor, temperature sensor, chemical sensor, force, acceleration, and rotation sensor, light sensor, current sensor, voltage sensor, conductivity sensor, Smart Cart, vehicle, levitating device, drone, self-guided device, self-propelled device, etc). The wireless device executes instructions of a software application or program with processing logic. In one example, the wireless device performs some or all of the operations of the method 100.

At operation 102, the method includes initiating a science software application on a wireless device (e.g., computing devices, tablets, laptops, notebook devices, mobile devices, etc.). At operation 104, the method further includes automatically displaying a sensor connection display on a user interface (e.g., user interface 300 of FIG. 3) of the wireless device. In one example, the sensor connection display may include a list of selectable available sensing devices that have been ordered based on proximity to the wireless device. At operation 106, the method further includes obtaining wireless sensor connection information including sensors that are advertising their availability to the wireless device. At operation 108, the method further includes sorting the available sensors as obtained at operation 106 by a power level indicator (e.g., received signal strength indicator (RSSI)). A RSSI value is a measurement of power present in a radio frequency signal of any available sensor that is received by the wireless device.

At operation 110, the method further includes automatically updating the sensor connection display on the user interface of the wireless device. The sensor connection display may include a list of selectable available sensing devices that have been ordered based on the received RSSI information that generally indicates proximity to the wireless device assuming no interference or minimal interference between each sensor and the wireless device. The update may occur frequently (e.g., once per second, once every two seconds, etc.). At operation 112, the method further includes determining whether the sensor connections are completed. For example, the method may obtain user input for this determination. If sensor connections are not complete at operation 112 (e.g., user is not able to locate and connect with a desired sensor), then the method proceeds back to operation 106. If the sensor connections are complete at operation 112 (e.g., user is able to locate and connect to a desired sensor, user selects option 380 of FIG. 3), then the method proceeds to continue a science experiment at operation 114.

Figure 2:
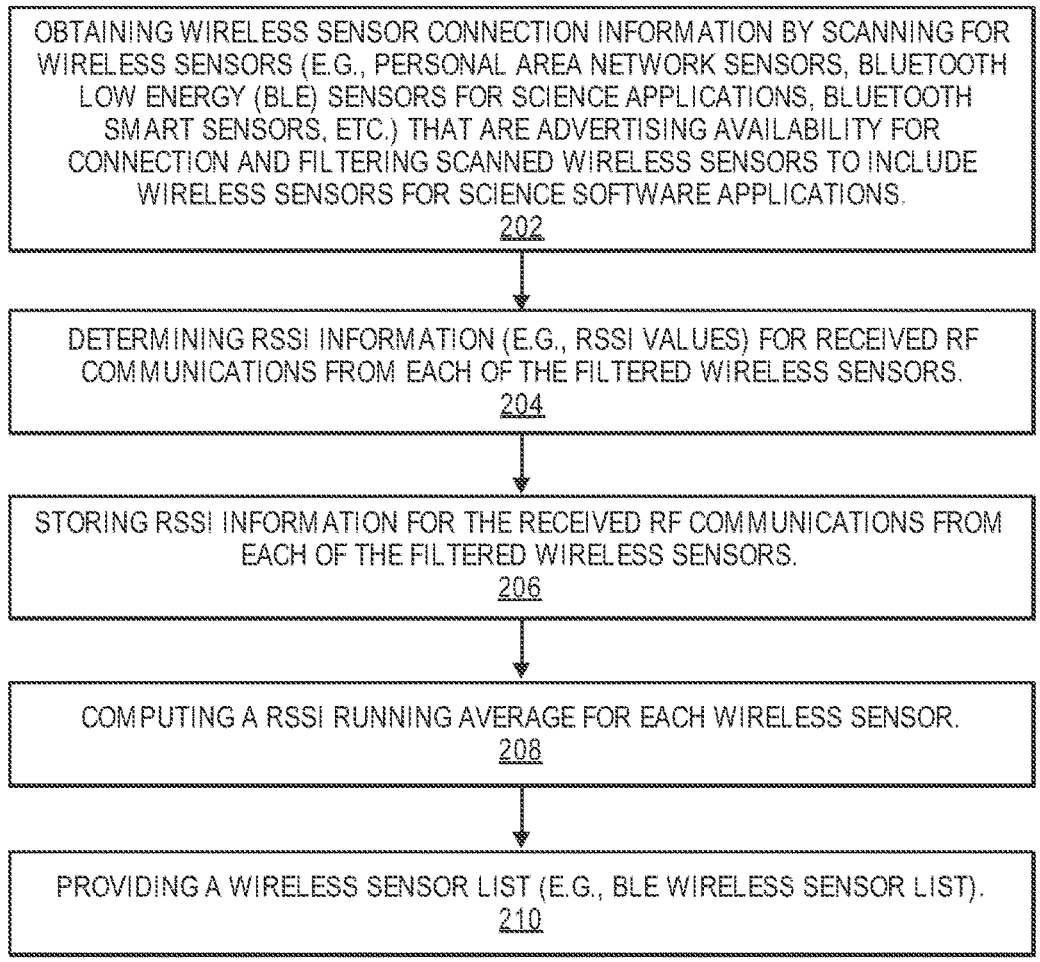
FIG. 2 illustrates a flow diagram of one embodiment for a method 200 of obtaining wireless sensor connection information including sensors that are advertising their availability to the wireless device for proximity in-app sensor pairing.

FIG. 2 illustrates a flow diagram of one embodiment for a method 200 of obtaining wireless sensor connection information including sensors that are advertising their availability to the wireless device for proximity in-app sensor pairing. The method 200 is performed by processing logic that may comprise hardware (circuitry, dedicated logic, etc.), software (such as is run on a general purpose computer system or a dedicated machine or a device), or a combination of both. In one embodiment, the method 200 is performed by processing logic of at least one wireless device (e.g., computing devices, tablets, laptops, notebook devices, mobile devices, etc.) that communicates with a wireless sensing device (e.g., any type of sensor, pressure sensor, temperature sensor, chemical sensor, force, acceleration, and rotation sensor, light sensor, current sensor, voltage sensor, conductivity sensor, Smart Cart, vehicle, levitating device, drone, self-guided device, self-propelled device, etc). The wireless device executes instructions of a software application or program with processing logic. In one example, the wireless device performs some or all of the operations of the method 200 that are sub-operations of the operation 106 of FIG. 1.

At operation 202, the method includes obtaining wireless sensor connection information by scanning for wireless sensors (e.g., personal area network sensors, Bluetooth low energy (BLE) sensors for science applications, Bluetooth Smart sensors, etc.) that are advertising availability for connection and filtering scanned wireless sensors to include wireless sensors for science software applications. In one example, other types of wireless sensors that are not designed for science software applications are not included in the filtered results. At operation 204, the method further includes determining RSSI information (e.g., RSSI values) for received RF communications from each of the filtered wireless sensors. At operation 206, the method further includes storing RSSI information for the received RF communications from each of the filtered wireless sensors. In one example, the most recent 5 RSSI values are stored for each of the filtered wireless sensors. At operation 208, the method includes computing a RSSI running average for each wireless sensor. In one example, the RSSI running average is calculated based on the most recent 5 RSSI values that are stored for each of the filtered wireless sensors. At operation 210, the method includes providing a wireless sensor list (e.g., BLE wireless sensor list). In one example, the wireless sensor list is provided at operation 106 of method 100.

Figure 3:
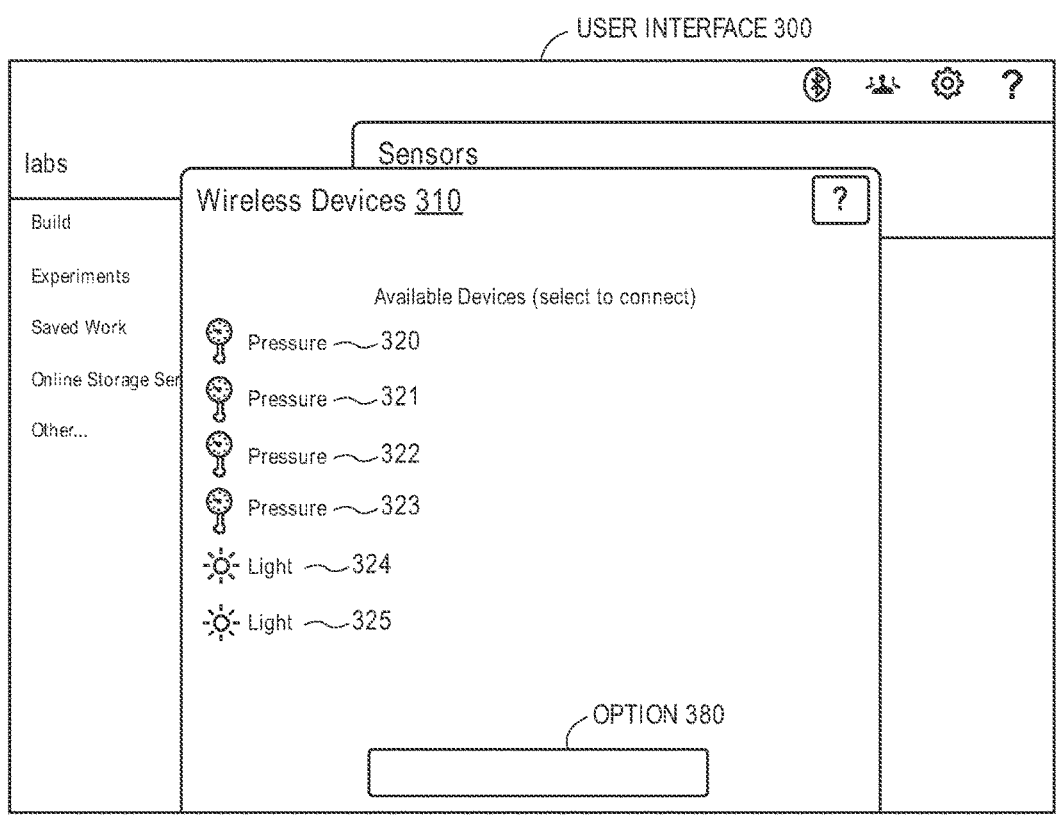
FIG. 3 illustrates a sensor connection display on a user interface 300 of a wireless device in accordance with one embodiment.

FIG. 3 illustrates a sensor connection display on a user interface 300 of a wireless device in accordance with one embodiment. The available wireless sensor devices include pressure sensors 320-323 and light sensors 324-325 for this user interface 300. Other types of wireless sensors can be displayed on the user interface 300 if discovered by the wireless device. Each of the sensors 320-325 represents a selectable option that a user can select to connect the wireless device with a selected wireless sensor. If the user completes connecting with the wireless sensors, then the user can select option 380 to dismiss the wireless device 310 view.

Figure 4:
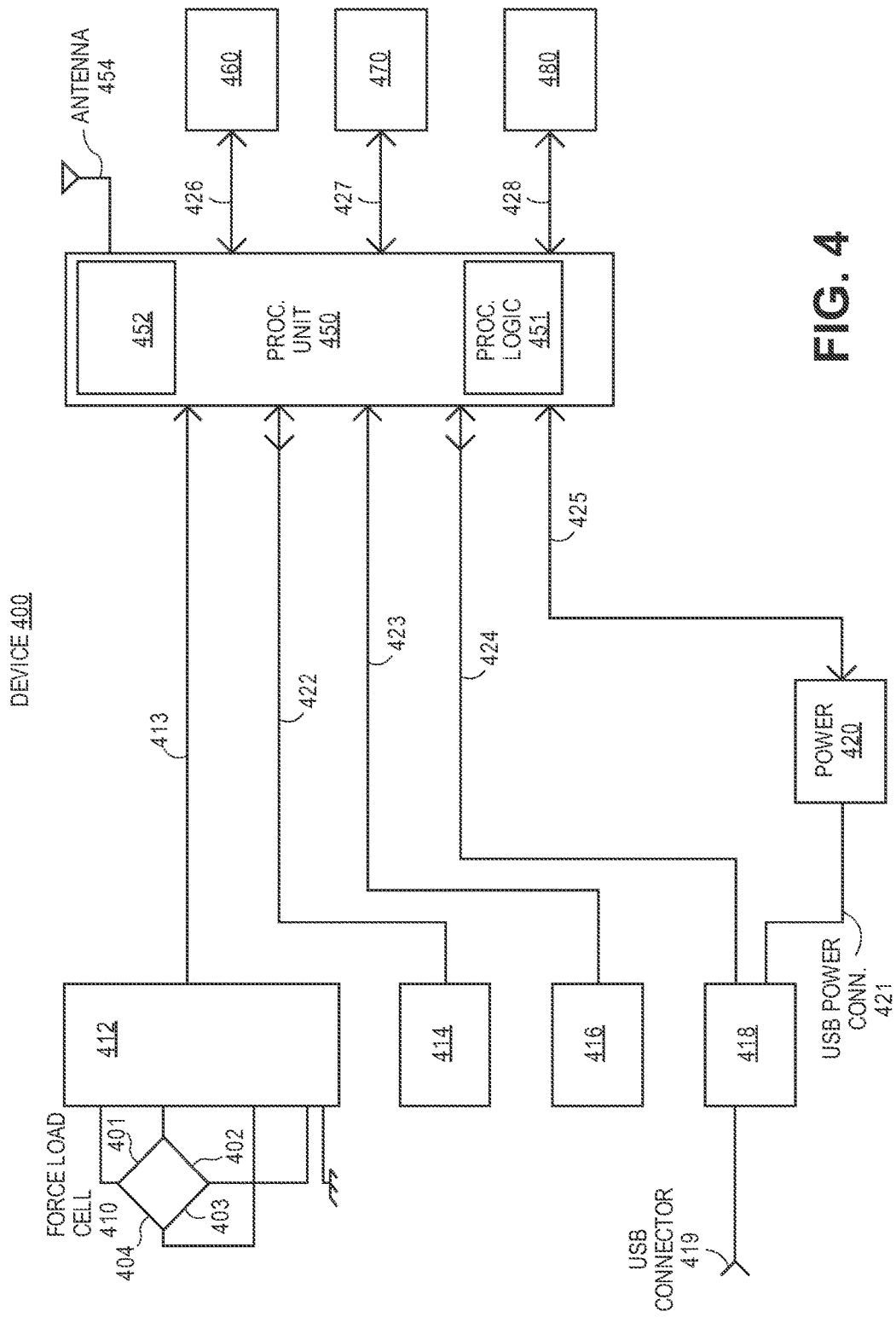
FIG. 4 illustrates a block diagram of a wireless sensor device having integrated force, position, acceleration, and rotational sensing according to one embodiment.

FIG. 4 illustrates a block diagram of a wireless sensor device having integrated force, position, acceleration, and rotational sensing according to one embodiment. This sensor device 400 may include a processing unit 450 (e.g., microprocessor) having a RF communication module 452 (e.g., Bluetooth, WiFi, Zigbee, etc.) with antenna 454 and also a processing unit 418 (e.g., USB microprocessor). The sensor device includes a force load cell 410 (e.g., strain gauge, hydraulic, pneumatic, etc.) that creates an electrical signal having a magnitude that is directly proportional to a force (e.g., +/−100 Newtons) being measured. In one example, the force load cell 410 is a strain gauge load cell having strain gauges 401-404 which are configured in a Wheatstone bridge configuration (e.g., 1 K ohm). The electrical signal output by the force load cell 410 is typically small (e.g., a few millivolts (mV), 2.3 mV/V with +/−0.23 mV/V) and is amplified by an amplifier of amplifier unit 412 to generate an amplified signal (e.g., 0.737 V with +/−0.735 V nominal). This unit 412 may also include a level shifter and a filter. This unit 412 generates an output signal that is sent to the processing unit 450 via a connection 413 (e.g., communication link, bus, signal line, electrical connection, etc.).

A motion unit 414 detects acceleration and rotational data. In one example, the motion unit 414 includes a 3-axis MEMs accelerometer for determining acceleration data in 3 dimensions and also a 3-axis MEMs gyroscope for determining rotational data in 3 dimensions that can be used for determining a slope of movement of the wireless device 400. The gyroscope can be physically aligned with the accelerometer. The motion unit 414 communicates with the processing unit 450 via the bi-directional connection 422 (e.g., communication link, bus, signal line, electrical connection, etc.). For example, acceleration and rotation data can be sent to the processing unit 450 and then transmitted to a wireless device.

A shaft encoder 416, (e.g., a mechanical encoder, an optical shaft encoder, etc.) may be positioned in proximity to an axle or shaft of the wireless device 410. The encoder 416 converts angular position of an axle or shaft that is coupled to a wheel into an analog or digital code. The processing unit 450 or a built-in decoder (e.g., quadrature decoder located in a body of the wireless device) then determines positional data of the wireless device 410. The encoder 416 communicates with the processing unit 450 via the bi-directional connection 423 (e.g., communication link, bus, signal line, electrical connection, etc.).

A processing unit 418 (e.g., USB microprocessor) is coupled to a USB connector 419 and a power module 420 (e.g., battery, charger, power supplies) that can provide USB power to the processing unit 418 via power connection 421. The power module 420 is coupled to the processing unit 450 via a bi-directional connection 425 and the processing unit 418 is coupled to the processing unit 450 via a bi-directional connection 424. The power module 420 provides power to the processing unit 450, which may have a different power supply (e.g., 3.3 volts) than the processing unit 418. The power module 420 may include a lithium polymer battery in combination with standard electronics that monitor the battery charge and prevent it from dropping below a critical level. In one example, a USB connection to the processing unit 418 performs an update of firmware of the device 400 in a faster manner than using a wireless connection of the RF communication module 452 for performing the update of firmware.

The processing unit 450 is coupled to a module 460, accessory port(s) 470, and memory 480 via bi-directional connections 426-428. The module 460 includes LEDs and power for illuminating different components (e.g., cart lights) of the device 400. The accessory port(s) 470 can be coupled to different types of accessories (e.g., fan propulsion, impulse plunger trigger, ball drop/projector apparatus). The memory 480 (e.g., flash memory) stores data and software instructions for the processing unit 450.

The memory 480 may include a machine-accessible storage medium having one or more sets of instructions (e.g., software) embodying any one or more of the methodologies or functions described herein. The software may also reside, completely or at least partially, within the memory 480 and/or within the processing unit 450 or 418 during execution thereof by the device 400, the memory 480 and the processing unit 450 also constituting machine-accessible storage media.

While the memory 480 (e.g., machine-accessible storage medium) is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

The processing units 418 and 450 represent one or more general-purpose processing devices such as a processing system, central processing system, or the like. More particularly, the processing units 418 and 450 may be a complex instruction set computing (CISC) processing system, reduced instruction set computing (RISC) processing system, very long instruction word (VLIW) processing system, or a processor implementing other instruction sets or processors implementing a combination of instruction sets. The processing units 418 and 450 may also be one or more special-purpose processing devices such as an application specific integrated circuit (ASIC), a field programmable gate array (FPGA), a digital signal processor (DSP), network processor, or the like. The processing unit 450 may be configured to execute the processing logic 451 for performing the operations and steps discussed herein.

In an alternative embodiment, the sensor device 400 includes a force load cell for detecting force and a motion unit for detecting acceleration and rotational data. The sensor device may not include a shaft encoder though and this device can be attached to any type of apparatus even apparatuses having no axles.

Figure 5:
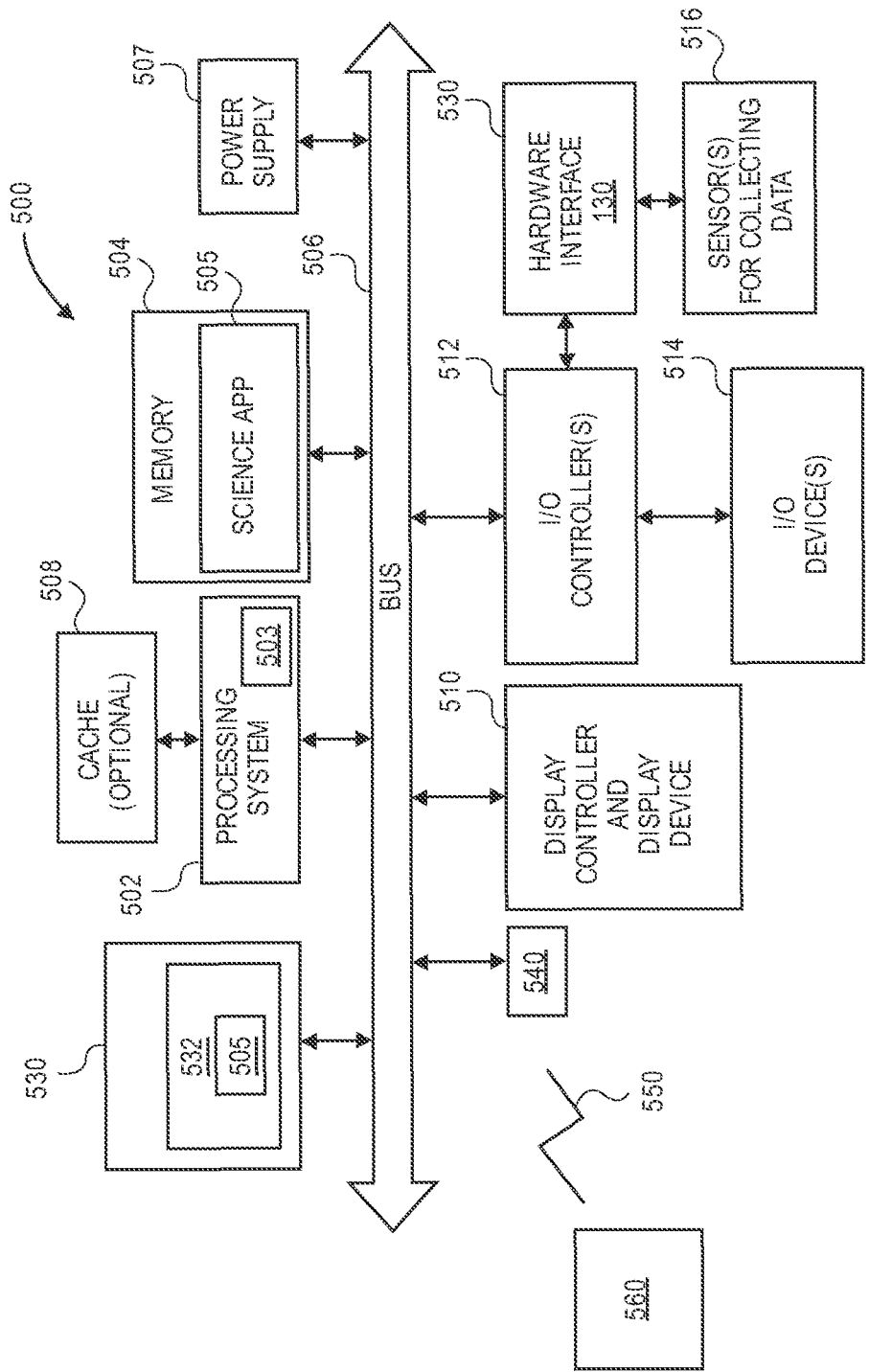
FIG. 5 illustrates a block diagram of a wireless device (e.g., client wireless device) according to one embodiment.

FIG. 5 illustrates a block diagram of a wireless device (e.g., client wireless device) according to one embodiment. This wireless device 500 may include a processing system 502 and a memory 504, which are coupled to each other through a bus 506. The memory stores one or more software programs including an operating system). In one embodiment, the memory 504 and/or data storage device 530 host a science software application 505 (e.g., inquiry tool 505) that provides an integrated science environment that may include content and instructions for a user.

The data storage device 530 may include a machine-accessible storage medium 532 on which is stored the science software application 505 having one or more sets of instructions (e.g., software) embodying any one or more of the methodologies or functions described herein. The software may also reside, completely or at least partially, within the main memory 504 and/or within the processor 502 during execution thereof by the device 500, the main memory 504 and the processor 502 also constituting machine-accessible storage media.

The machine-accessible storage medium 532 may also be used to store data structure sets (e.g. database) that define user identifying states and user preferences that define user profiles. While the machine-accessible storage medium 532 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

The processing system 502 represents one or more general-purpose processing devices such as a processing system, central processing system, or the like. More particularly, the processor 502 may be a complex instruction set computing (CISC) processing system, reduced instruction set computing (RISC) processing system, very long instruction word (VLIW) processing system, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 503 for performing the operations and steps discussed herein.

The device 500 also includes a power supply 507 (e.g., battery, voltaic cell). The device 500 may optionally include a cache 508 which is coupled to the processing system 502. This device may also optionally include a display controller and display device 510 which is coupled to the other components through the bus 506. One or more input/output controllers 512 are also coupled to the bus 506 to provide an interface for input/output devices 514 and to provide an interface for one or more sensors 516 which are for data acquisition. The bus 506 may include one or more buses connected to each other through various bridges, controllers, and/or adapters as is well known in the art. The input/output devices 514 may include a touchscreen having a virtual keypad or a virtual keyboard or a cursor control device such as a touch input panel to enable user interaction with the science software application 505. The sensors 516 may be attached to the bus 506 via a hardware interface 530 having one or more ports. For example, the hardware interface 530 may include USB port(s), Mini-USB port(s), a DC port, Mini-DIN ports, 2.5 phono ports, 3.5 phone ports, and charging pads/contacts. The sensors 516 may be analog or digital sensors including multimeasure sensors requiring fewer wires than analog sensors. A multimeasure sensor can record multiple sensor measurements with a single module.

A network interface 540 (e.g., RF transceiver) for a wireless network 550 (e.g., BlueTooth, BLE, WiFi) may be communicatively coupled to one or more wireless sensors 560 (e.g., any type of sensor, pressure sensor, temperature sensor, chemical sensor, force, acceleration, and rotation sensor, light sensor, current sensor, voltage sensor, conductivity sensor, Smart Cart, vehicle, levitating device, drone, self-guided device, self-propelled device, etc), which can be similar to the sensors 516, except also having the ability to communicate wirelessly to a network or directly to the client device.

In at least certain implementations of the device 500, the processing system 502 may receive data from one or more sensors 516, and may cause the science software application 505 to perform the analysis of that data in the manner described herein. In certain embodiments of the present disclosure, the device 500 can be used to implement at least some of the methods discussed in the present disclosure.

In certain embodiments, the device or client device may be a data processing system, such as, for example, entertainment systems or personal digital assistants (PDAs), or general purpose computer systems, or special purpose computer systems, or an embedded device within another device, or a desktop computer, or a laptop computer, or a tablet device, or a netbook computer, or a hand-held device.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method comprising:
    initiating a science software application on a wireless device;
    automatically displaying a sensor connection display on a user interface of the wireless device with the sensor connection display including selectable available sensors, wherein each of the selectable available sensors is available for establishing a connection with the wireless device;
    obtaining wireless sensor connection information for sensors that are advertising their availability to the wireless device;
    sorting the available sensors based on proximity to the wireless device as determined by the wireless sensor connection information including received signal strength indicator (RSSI) information;
    selecting, from the sensor connection display based at least in part on proximity to the wireless device, a subset of the available sensors that are to be used by the science software application to perform the science experiment and are closest to the wireless device, wherein the selecting comprises establishing a wireless connection between the wireless device and the selected subset of available sensors and receiving sensor data from the selected subset of available sensors; and
    performing, by the wireless device, the science experiment using the received sensor data from the selected subset of available sensors.

2. The computer implemented method of claim 1 further comprising:
    automatically updating the sensor connection display on the user interface of the wireless device with the sensor connection display including selectable available sensors that have been ordered based on the RSSI information to indicate proximity to the wireless device.

3. The computer implemented method of claim 2 further comprising:
    determining whether the sensor connections to the wireless device are completed.

4. The computer implemented method of claim 1 wherein obtaining wireless sensor connection information for sensors that are advertising their availability to the wireless device further comprises scanning, with the wireless device, for wireless sensors that are advertising availability for connection and identifying the scanned wireless sensors that include wireless sensors for science software applications including the initiated science software application.

5. The computer implemented method of claim 4 wherein the RSSI information includes RSSI values for received RF communications from each of the filtered wireless sensors.

6. The computer implemented method of claim 5 further comprising storing RSSI information for the received RF communications from each of the filtered wireless sensors.

7. The computer implemented method of claim 6 further comprising computing a RSSI running average for each wireless sensor.

8. A non-transitory machine-accessible medium including instructions that, when executed by a machine, cause the machine to perform a method comprising:
    initiating a science software application on a wireless device;
    automatically displaying a sensor connection display on a user interface of the wireless device with the sensor connection display including selectable available sensors, wherein each of the selectable available sensors is available for establishing a connection with the wireless device;
    obtaining wireless sensor connection information for sensors that are advertising their availability to the wireless device;
    sorting the available sensors based on proximity to the wireless device as determined by the wireless sensor connection information including received signal strength indicator (RSSI) information;

selecting, from the sensor connection display based at least in part on proximity to the wireless device, a subset of the available sensors that are to be used by the science software application to perform the science experiment and are closest to the wireless device, wherein the selecting comprises establishing a wireless connection between the wireless device and the selected subset of available sensors and receiving sensor data from the selected subset of available sensors; and performing, by the wireless device, the science experiment using the received sensor data from the selected subset of available sensors.

9. The non-transitory machine-accessible medium of claim 8 further comprising:
automatically updating the sensor connection display on the user interface of the wireless device with the sensor connection display including selectable available sensors that have been ordered based on the RSSI information to indicate proximity to the wireless device.

10. The non-transitory tangible machine-accessible medium of claim 9 further comprising:
determining whether the sensor connections to the wireless device are completed.

11. The non-transitory machine-accessible medium of claim 8 wherein obtaining wireless sensor connection information for sensors that are advertising their availability to the wireless device further comprises scanning, with the wireless device, for wireless sensors that are advertising availability for connection and identifying the scanned wireless sensors that include wireless sensors for science software applications including the initiated science software application.

12. The non-transitory machine-accessible medium of claim 11 wherein the RSSI information includes RSSI values for received RF communications from each of the filtered wireless sensors.

13. The non-transitory machine-accessible medium of claim 12 further comprising storing RSSI information for the received RF communications from each of the filtered wireless sensors.

14. The non-transitory machine-accessible medium of claim 13 further comprising computing a RSSI running average for each wireless sensor.

15. A wireless device comprising:
memory to store software including a science software application; and
at least one processing unit coupled to the memory, the at least one processing unit to execute instructions to:
initiate the science software application,
automatically display a sensor connection display on a user interface of the wireless device with the sensor connection display including selectable available sensors, wherein each of the selectable available sensors is available for establishing a connection with the wireless device,
obtain wireless sensor connection information for sensors that are advertising their availability to the wireless device,
sort the available sensors based on proximity to the wireless device as determined by the wireless sensor connection information including received signal strength indicator (RSSI) information,
select, from the sensor connection display based at least in part on proximity to the wireless device, a subset of the available sensors that are to be used by the science software application to perform the science experiment and are closest to the wireless device, wherein the selection comprises establishing a wireless connection between the wireless device and the selected subset of available sensors and receiving sensor data from the selected subset of available sensors, and
perform the science experiment using the received sensor data from the selected subset of available sensors.

16. The wireless device of claim 15 wherein the at least one processing unit to execute instructions to automatically update the sensor connection display on the user interface of the wireless device with the sensor connection display including selectable available sensors that have been ordered based on the RSSI information to indicate proximity to the wireless device.

17. The wireless device of claim 16 wherein the at least one processing unit to execute instructions to determine whether the sensor connections to the wireless device are completed.

18. The wireless device of claim 15 wherein obtaining wireless sensor connection information for sensors that are advertising their availability to the wireless device further comprises scanning, with the wireless device, for wireless sensors that are advertising availability for connection and identifying the scanned wireless sensors that include wireless sensors for science software applications including the initiated science software application.

19. The wireless device of claim 18 wherein the RSSI information includes RSSI values for received RF communications from each of the filtered wireless sensors.

20. The wireless device of claim 19 wherein the at least one processing unit to execute instructions to store RSSI information for the received RF communications from each of the filtered wireless sensors and to compute a RSSI running average for each wireless sensor.

* * * * *